May 3, 1932.  R. IRVIN  1,856,915
SKID PREVENTING DEVICE
Filed Oct. 8, 1930  2 Sheets—Sheet 1
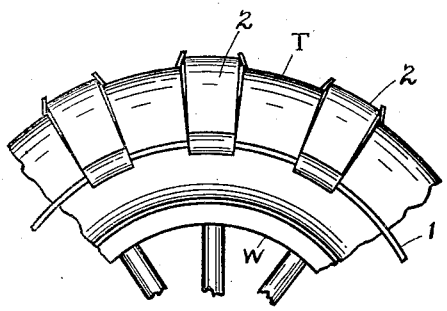
Fig. I
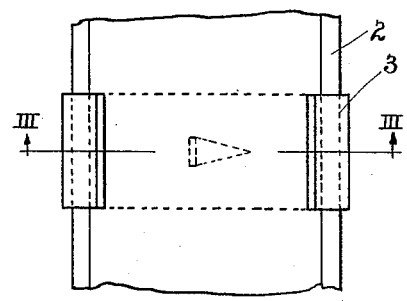
Fig. II
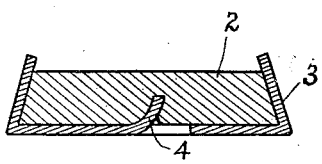
Fig. III
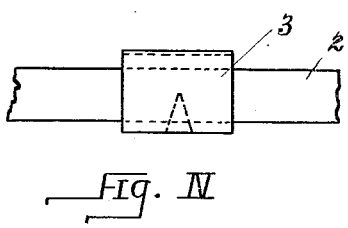
Fig. IV
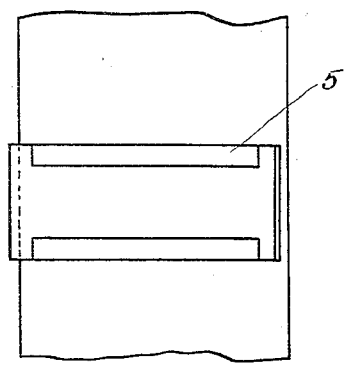
Fig. V
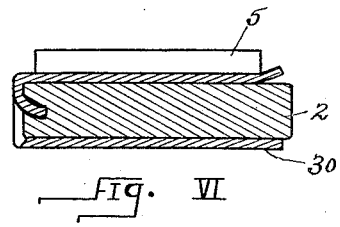
Fig. VI
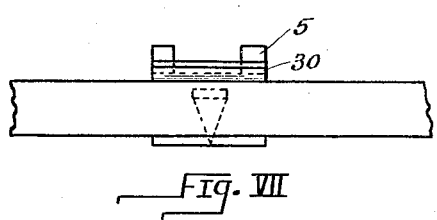
Fig. VII
INVENTOR
Richard Irvin
by Christy Christy and Wharton
his attorneys May 3, 1932. R. IRVIN 1,856,915
SKID PREVENTING DEVICE
Filed Oct. 8, 1930 2 Sheets-Sheet 2
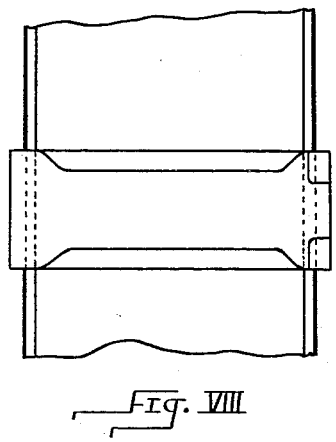
Fig. VIII
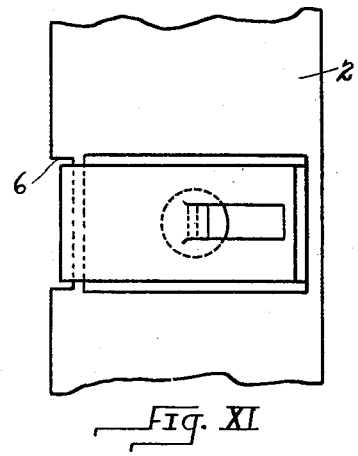
Fig. XI
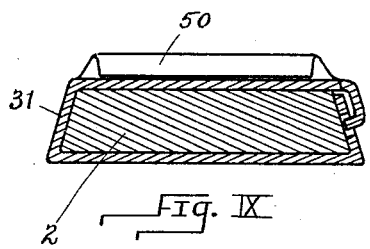
Fig. IX
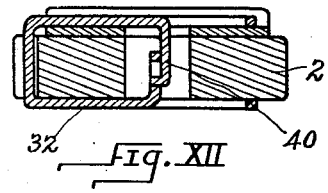
Fig. XII
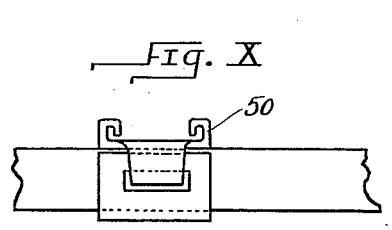
Fig. X
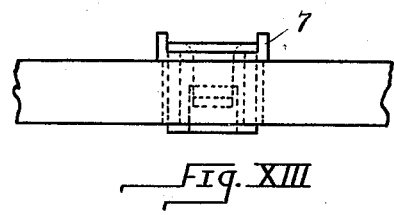
Fig. XIII
INVENTOR
Richard Irvin
by Christy Christy and Wharton
his attorneys Patented May 3, 1932

1,856,915

UNITED STATES PATENT OFFICE

RICHARD IRVIN, OF KNOXVILLE, PENNSYLVANIA

SKID PREVENTING DEVICE

Application filed October 8, 1930. Serial No. 487,172.

My invention relates to improvements in skid-preventing devices applicable to pneumatic vehicle tires, and the object of improvement is such a device, which shall be effective on various skid-inducing surfaces, and at the same time durable.

In the accompanying drawings, Fig. I is a view in side elevation showing a tire of the nature indicated, having applied to it the device of my invention. Fig. II is a fragmentary view in plan and to larger scale of a portion of the structure. Fig. III is a view in cross-section on the plane indicated by the line III—III, Fig. II. Fig. IV is a view in side elevation of that portion of the structure which is shown in Figs. II and III. Figs. V, VI, and VII are views corresponding to Figs. II, III, and IV, and illustrating a modification. Figs. VIII, IX, and X similarly illustrate another modification, and Figs. XI, XII, and XIII similarly illustrate yet another modification.

Referring first to Fig. I, a tire T is shown in place upon a wheel W, and to the tire so placed the device of the invention is applied. This device includes two tension members 1, of which one only appears in the figure, which tension members, when the device is applied, extend circularly against opposite faces of the tire. These tension devices may be cords or chains, and they will, in known manner, be provided with one or more separable couplings in the round of their extent. Between the pairs of tension members 1 extend at proper intervals bands 2 of elastic material, preferably of rubber reinforced with embedded fabric. The dimensions of these bands will vary, but, typically, they may be 3 inches wide and ⅝ of an inch thick when free of strain. At their ends they are properly secured to the tension members, and for that purpose they are conveniently formed with terminal loops, through which the tension members may extend.

Referring to Figs. II, III, and IV, each band is equipped with one or more clips 3, arranged in succession longitudinally of the band and transversely of the tire tread. The number may vary, but ordinarily there will be two or three clips applied to each band.

The clips are made of sheet metal, shaped and proportioned to their service. As shown in Figs. II, III, and IV, these clips are of such proportions and are so shaped as incompletely to surround the band. Each clip may be made of a strip of metal from one-half an inch to one inch wide. The strip is bent to channel shape with converging sides, as is best seen in Fig. III. The mid-web of the channel is adapted to underlie the band 2, and in the application to extend between the band 2 and the tread of the tire. The converging sides of the channel are adapted to bear against the opposite edges of the band 2. These sides of the channel are of such extent as slightly to project beyond the outer face of the band 2. The whole clip is elastic, and there is co-operation between the essentially elastic band 2 and the essentially elastic clip. Under the pressure incident to service, the clip exerts compressive strain over practically the entire cross-section of the surrounded band; the elastic body of the band in turn affords support to the clip when so under compressive strain. Each supports the other, and the greater the strain the more firm the engagement between these parts. The outer edges of the clips, extending beyond the elastic body of the band 2, engage the road surface like claws, and by such engagement resist skidding tendencies.

The engagement of the clip with the band may be increased by forming in the substance of the clip, preferably in the web of the channel, a spur 4, which, in the assembly, is sunk into the substance of the band.

Figs. V, VI, and VII illustrate a modification in this, that the channel-shaped clip 30 overlies the opposite inner and outer faces of the band 2, and is provided with outstanding road-engaging lugs or cleats 5.

Comparing Figs. II and V, it will be perceived that, whereas in the form first described the road-engaging tips of the clips 3 extend transversely of the mid-line of the tread of the tire, the lugs 5 of the clip of Figs. V, VI, and VII extend in a direction parallel to the mid-line of the tread of the tire.

In the form shown in Figs. VIII, IX, and

X, the strip of sheet metal of which the clip 31 is formed completely surrounds the body of the band 2, and in this case the cleats 50 are formed by the inturned side edges of the strip of which the clip 31 is formed.

The clip of the modification of Figs. XI, XII, and XIII resembles that of Figs. V, VI, and VII, in that it overlies the upper and lower surfaces and one of the side surfaces of the band 2. A lock is in this case effected by inturned ends 40 of the strip of which the clip 32 is formed, these inturned ends meeting in an opening formed for them in the band. In this case the clip is further fixed in its position upon the band 2 by being applied in a marginal notch or recess 6 in the band 2. The clip of this modification further differs from those previously described in that the road-engaging cleats 7 are the edges of a supplemental hard steel shoe, which in the assembly underlies a portion of the clip 32, and this shoe is by the clip 32 held to place.

I claim as my invention:

1. An anti-skid device for a pneumatic vehicle tire including a band of elastic material adapted to extend transversely across the tread of a tire, and an elastic channel-shaped metallic clip with converging opposite sides adapted to underlie said band, the medial web of the channel interposed between the band and the tread of the tire, and converging sides of the clip engaging opposite edges of the said band, and the outer ends of the clip adapted to engage the road, the arrangement being such that under compression incident to service the opposite converging sides of the clip exert opposite transverse compressive strains upon the band.

2. The structure of claim 1, the clip being provided with an integral, bent-aside spur sunk in the substance of the band.

In testimony whereof I have hereunto set my hand.

RICHARD IRVIN.